(12) United States Patent
Auracher et al.

(10) Patent No.: US 6,614,605 B2
(45) Date of Patent: Sep. 2, 2003

(54) ADJUSTING APPARATUS AND METHOD FOR ITS ADJUSTMENT

(75) Inventors: Franz Auracher, Baierbrunn (DE); Henning Hanebuth, Feldkirchen (DE); Julius Wittmann, Oberhaching (DE); Christoph Hamann, Williamsburg, VA (US)

(73) Assignee: Infineon Technologies AG, Munich (DE)

( * ) Notice: Subject to any disclaimer, the term of this patent is extended or adjusted under 35 U.S.C. 154(b) by 7 days.

(21) Appl. No.: 09/922,374

(22) Filed: Aug. 3, 2001

(65) Prior Publication Data

US 2002/0021480 A1 Feb. 21, 2002

(30) Foreign Application Priority Data

Aug. 3, 2000 (DE) .......................... 100 37 975

(51) Int. Cl.$^7$ ................................. G02B 7/02
(52) U.S. Cl. ................ 359/824; 359/822; 359/819
(58) Field of Search ................ 359/824, 822, 359/819

(56) References Cited

U.S. PATENT DOCUMENTS

| | | | | |
|---|---|---|---|---|
| 4,460,134 A | * | 7/1984 | Kunz ..................... | 242/599.3 |
| 5,191,200 A | * | 3/1993 | van der Werf et al. .. | 250/201.4 |
| 5,572,895 A | | 11/1996 | Hoving et al. ........... | 72/342.94 |
| 5,674,650 A | * | 10/1997 | Dirksen et al. ............... | 430/22 |
| 5,877,904 A | * | 3/1999 | Kawano et al. ............. | 359/824 |
| 6,002,534 A | * | 12/1999 | Ueyama ..................... | 359/824 |
| 6,030,114 A | | 2/2000 | DiMarco et al. ............... | 374/1 |
| 6,292,609 B1 | * | 9/2001 | Matsushima et al. ......... | 385/43 |

FOREIGN PATENT DOCUMENTS

| | | |
|---|---|---|
| DE | 198 43 965 A1 | 4/2000 |
| EP | 0 373 225 A1 | 6/1990 |

* cited by examiner

*Primary Examiner*—Ricky Mack
*Assistant Examiner*—Brandi N Thomas
(74) *Attorney, Agent, or Firm*—Laurence A. Greenberg; Werner H. Stemer; Gregory L. Mayback (57) ABSTRACT

An adjusting apparatus is provided, in particular, for the adjustment of a lens in an optoelectronic transmitting/receiving device, has a number of actuating elements or actuators, whose form or whose length can be altered by local application of radiation energy, preferably as laser radiation. The actuating elements are connected to a stationary base plate at one of their ends and connected to a movable carrier plate at their other end. The actuating elements can be disposed in such a way that they enable coarse adjustment and subsequent fine adjustment by the laser beam.

22 Claims, 9 Drawing Sheets

ADJUSTING APPARATUS AND METHOD FOR ITS ADJUSTMENT

BACKGROUND OF THE INVENTION

Field of the Invention

The invention relates to an adjusting apparatus, in particular for a lens in an optoelectronic transmitting/receiving device, and a method for adjusting the adjusting apparatus.

In optoelectronic transmitting/receiving devices for communication via optical fiber networks, one of the main problems consists in providing an optical connection between an optical fiber that is coupled on in a connection opening and a transmitting/receiving component. In the case of a laser module used for a transmitting device, the divergent laser beam of a laser diode is imaged by one or more lenses onto the end face of an optical fiber in such a way as to obtain a maximum coupling-in efficiency of the laser power into the optical fiber. When monomode optical fibers are coupled on, this is achieved by a single lens or a lens pair imaging the so-called spot size of the laser onto the light entry opening of the optical fiber. When two lenses are used, an aspherical lens is preferably used as the first lens owing to the laser radiation beam angle, which is usually large. Furthermore, in the case of the two-lens configuration, a collimated beam is often sought between the two lenses because the distance between the lenses is then non-critical. However, in the case of two-lens configurations, it is likewise possible for the first lens to generate a greatly enlarged intermediate image which is reduced again to the light entry opening of the fiber by the second lens. Semiconductor lasers for optical wide-area transmission systems emit at wavelengths of 1.3 $\mu$m or 1.55 $\mu$m and have spot radii of the order of magnitude of 1 $\mu$m. Corresponding monomode optical fibers have spot radii of an order of magnitude of 5 $\mu$m. In order to attain a high coupling efficiency, the first lens typically has to be adjusted and fixed with an accuracy of ±0.5 $\mu$m in the x- and y-direction and of ±2 to 5 $\mu$m in the z-direction with regard to the laser chip. For reasons of long-term stability, the fixing is usually carried out either by AuSn soldering or by laser welding. In order that the lens carriers can be produced with acceptable tolerances or a welding distortion when fixing the lens carrier can be corrected, it is particularly advantageous if targeted readjustment of the lens carrier and thus of the lens position can be carried out by laser pulses. Instead of the lens coupling, the optical fiber can also be directly coupled to the laser. The fiber end face is often melted or etched for this purpose, thereby producing a suitable lens profile on the optical fiber itself. In this case, the (locally metallized) optical fiber can be fixed e.g. by soldering on the laser-adjustable carrier.

Adjusting apparatuses for lenses and methods for adjusting them in which laser-adjustable actuating elements or actuators are used are already known. These known configurations are based on the temperature gradient mechanism (TGM), in which a laser beam impinging on the surface of a sheet-metal part introduces into the material, by melting the material on the surface, shrinkage stresses distributed non-uniformly over the sheet-metal thickness. As a result, the sheet-metal part flexes when cooling in the direction of the incident laser beam. For an adjustment operation with single-sided accessibility for the laser beam, this results in that adjustment can be effected reliably and in a defined manner only in one direction, in other words a distance can only be lengthened or shortened as a result of the bending. Using so-called actuators, however, it is also possible to realize further directions of movement in the case of only single-sided accessibility of the laser beam. In this case, an actuator is understood to be a three-dimensional sheet-metal structure on which, by introducing shrinkage stresses at specific places, it is possible to initiate defined movements of the actuator in different directions.

Published, European Patent Application EP 0 373 225 A1 describes an optoelectronic semiconductor device in which an optoelectronic semiconductor component is retained by a carrier block and, at the same time, a lens holder is fixed on the carrier block, a lens positioned opposite the optoelectronic component being mounted into the lens holder. The lens holder is preformed in such a way that it deforms in a desirable manner as a result of local exposure to a laser beam and, consequently, the position of the lens can be altered with regard to the optoelectronic component.

Furthermore, U.S. Pat. No. 5,572,895 describes a method for reciprocal adjustment of two members of one or more actuators, the members being connected via a bridge. In this method, too, laser energy is fed to the actuators at suitable places in order to bring about a desired adjustment.

Finally, U.S. Pat. No. 6,030,114 discloses a laser-adjustable fuse switch in which, according to the same principle as explained above, a pre-bent contact connection of a bimetal strip can be adjusted for calibration purposes by application of a laser beam.

These known methods have the disadvantage, however, that they generally permit only an empirical procedure during the adjustment by application of a laser beam. Moreover, the adjusting apparatuses are generally configured in such a way that they allow only coarse adjustment or fine adjustment. In many cases, the adjustment also does not exhibit long-term stability owing to the stresses incorporated during the laser processing.

SUMMARY OF THE INVENTION

It is accordingly an object of the invention to provide an adjusting apparatus and a method for its adjustment that overcome the above-mentioned disadvantages of the prior art devices and methods of this general type, which make it possible to carry out more targeted adjustment, in particular by providing coarse adjustment and fine adjustment.

With the foregoing and other objects in view there is provided, in accordance with the invention, an adjusting apparatus containing a stationary base plate, a movable carrier plate, and a number of actuating elements each having a first end, a second end, and a form that can be altered by local application of radiation energy. Each of the actuating elements is connected to the stationary base plate at the first end and to the movable carrier plate at the second end.

In an adjusting apparatus according to the invention, a number of actuating elements whose form can be altered by local application of radiation energy, preferably in the form of laser radiation, are connected to the stationary base plate at one of their ends and to the movable carrier plate at their other end. An optical component to be adjusted, such as a lens, can be mounted onto the carrier plate. In this case, the adjusting apparatus may also be part of an optoelectronic transmitting/receiving device which has an optoelectronic component such as a laser diode or a semiconductor photodetector and a connection opening for an optical fiber, and in which a carrier which retains the optoelectronic component is mounted on stationary parts of the adjusting apparatus, in which case, in the mounted and adjusted state, the optoelectronic component is exactly aligned with the lens and the light entry opening of the optical fiber.

The invention makes it possible to dispose a plurality of actuating elements of different configurations between the base plate and the carrier plate, which actuating elements make it possible to set the different degrees of freedom of the adjustment and of the movement of the carrier plate independently of one another. In particular, the invention makes it possible to dispose a plurality of actuating elements relative to one another in such a way that they act with different transmission, so that one actuating element can be utilized for the coarse adjustment and the second actuating element can be utilized for the fine adjustment.

The individual actuating elements can have different configurations, some of which are known per se in the prior art. By way of example, in a particularly simple embodiment, one actuating element may be configured as a linear, in particular bar-shaped actuating element whose length can be altered by application of a laser beam or the like along one direction. In this case, it may be provided that the actuating element is formed by a thin bar over its entire length, to which bar radiation energy can be applied at any point for the purpose of changing the length. Since this is generally not particularly stable, embodiments are usually chosen in which, between stabler sections of larger diameter (actuating element members), weak points of smaller diameter (webs) are formed at which the radiation energy is to be coupled in and at which the actual change of length takes place. Thus, an actuating element which acts only in one direction may have a number of two or more actuating element members which are disposed in the direction of the normal between the base plate and the carrier plate at a distance from one another and are each connected to one another by at least one web running in the direction of the normal. In this case, a plurality of webs may also be disposed parallel alongside one another. These webs may be so closely adjacent that even the exposure of only individual webs leads only to a change in length in the direction of the normal. However, the webs may also be spaced apart further from one another, so that a change in length brought about by the application of radiation to an individual web effects a movement of the carrier plate with a component in the direction of the normal and a transverse component with respect to the direction of the normal.

If the webs are spaced relatively far apart from one another in the embodiment described above, then an adjustment in two degrees of freedom can be carried out by an adjustment operation. It is more advantageous, by contrast, if the adjustment in the two degrees of freedom can be carried out by mutually independent adjustment operations. This is achieved by an adjusting apparatus in which one actuating element has a number of three or more actuating element members disposed between the base plate and the carrier plate, at least two actuating element members being disposed relative to one another in such a way that they are disposed in the direction of the normal between the base plate and the carrier plate at a distance from one another and are connected to one another by at least one web, and at least two other actuating element members are disposed relative to one another in such a way that they are spaced apart from one another in a lateral direction and are connected to one another by at least one web.

An essential aspect of the invention as mentioned above is that it opens up the possibility of constructing an adjusting apparatus in which a coarse adjustment can be carried out for one degree of freedom and then a fine adjustment can be carried out for the same degree of freedom. For this purpose, a first actuating element is connected to the carrier plate at a distance a from an outer edge of the carrier plate, and at a distance b therefrom, a second actuating element is connected to the carrier plate, so that the first actuating element can be used to carry out coarse adjustment and the second actuating element can be used to carry out fine adjustment with the transmission ratio $a/(a+b)$.

Another equally simple actuating element is a two-dimensional, in particular plate-shaped actuating element that can change its form in two directions by a corresponding application.

Other more complex configurations of actuating elements are also conceivable, which can be mounted between the base plate and the carrier plate. By way of example, it is possible to use an actuating element which is essentially disclosed in European Patent Application EP 0 373 225 already mentioned and which has two planar sections which are disposed at an angle with respect to one another and are connected by an articulated joint. Such an actuating element can be formed from a sheet-metal part, like the other actuating elements described. The articulated joint at the bending point between the two planar sections can be formed in a simple manner by a reduced sheet-metal thickness and/or by cutouts in the sheet-metal part. A complete adjusting apparatus can be formed from two or more angular actuating elements of this type which are disposed on two opposite sides of the carrier plate, the bending points of the angular actuating elements preferably facing one another. Such an adjusting apparatus has the advantage that it can be used to carry out adjustment operations in different, mutually opposite directions, depending on the locations of the actuating elements to which the radiation energy is fed. In particular, for increasing the distance between the carrier plate and the base plate, the radiation energy is fed to those planar sections of the actuating elements which face the base plate, and for reducing the distance between the carrier plate and the base plate, the radiation energy is fed to those planar sections of the actuating elements which face the carrier plate.

As in this concrete embodiment, angular actuating elements of this type can be directly connected to the base plate and the carrier plate, in which case articulated joints can be provided at the connection points. The articulated joints being formed in a simple manner by a reduced sheet-metal thickness and/or by cutouts in the sheet-metal part.

However, it may also be provided that one actuating element is connected to an angle element which has two planar and bending-resistant sections which are disposed at an angle with respect to one another and are connected by an articulated joint, the angle element being connected to the base plate and the carrier plate by its planar sections and at least one of these connections having an articulated joint which is preferably likewise formed in the manner described above. In the case of such a construction, during the adjustment operation, the angular actuating element acts indirectly on the carrier plate by moving the planar sections of the angle element toward one another or away from one another.

One important application of the adjusting apparatus according to the invention concerns the adjustment of a lens mounted on the carrier plate relative to an optoelectronic component such as a semiconductor laser and a light entry or light exit face of an optical fiber. The adjusting apparatus can thus be part of an optoelectronic transmitting/receiving device which has a transmitting/receiving component, a connection opening for an optical fiber and a lens disposed between the connection opening and the transmitting/receiving component, the lens being mounted on a carrier plate of the adjusting apparatus according to the invention.

In this case, the transmitting/receiving component and/or the fiber connection opening may be fitted to stationary parts of the adjusting apparatus, such as the base plate.

The different configurations of adjusting apparatuses enable defined, reproducible adjustment, so that, in the case of high numbers, the adjustment operation can also be automated. The required (lens) carriers can be produced cost-effectively for example by customary stamping and bending methods.

With the foregoing and other objects in view there is provided, in accordance with the invention, an adjustment method. The method includes providing an adjusting apparatus having a stationary base plate, a movable carrier plate, and a number of actuating elements each having a first end, a second end, and a form that can be altered by a local application of radiation energy. Each of the actuating elements is connected to the stationary base plate at the first end and to the movable carrier plate at the second end. A predetermined quantity of the radiation energy is fed to the actuating elements at predetermined locations.

In accordance with an added mode of the invention, there are the steps of providing at least one of the actuating elements to have at least two actuating element members disposed in a direction of a normal between the stationary base plate and the movable carrier plate at a distance from one another and are each connected to one another by at least one web; and feeding the radiation energy to the web.

In accordance with an additional mode of the invention, there are the steps of providing at least one of the actuating elements as an angular actuating element having two planar sections disposed at an angle with respect to one another and having articulated joints connected to the stationary base plate and the movable carrier plate; and feeding the radiation energy to the planar sections.

In accordance with another mode of the invention, there is the step of feeding the radiation energy to the planar sections of the actuating elements that face the stationary base plate for increasing a distance between the movable carrier plate and the stationary base plate.

In accordance with a further mode of the invention, there is the step of feeding the radiation energy to the planar sections of the actuating elements which face the movable carrier plate for reducing a distance between the movable carrier plate and the stationary base plate.

In accordance with a concomitant mode of the invention, there is the step of using a laser beam for supplying the radiation energy.

Other features which are considered as characteristic for the invention are set forth in the appended claims.

Although the invention is illustrated and described herein as embodied in an adjusting apparatus and a method for its adjustment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5b is a side-elevational view of the angular adjusting element shown in FIG. 5a;

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown an embodiment of an adjusting apparatus according to the invention in which adjustment of a lens 1 mounted on a movable carrier plate 2 is intended to be made possible.

Figure 1:
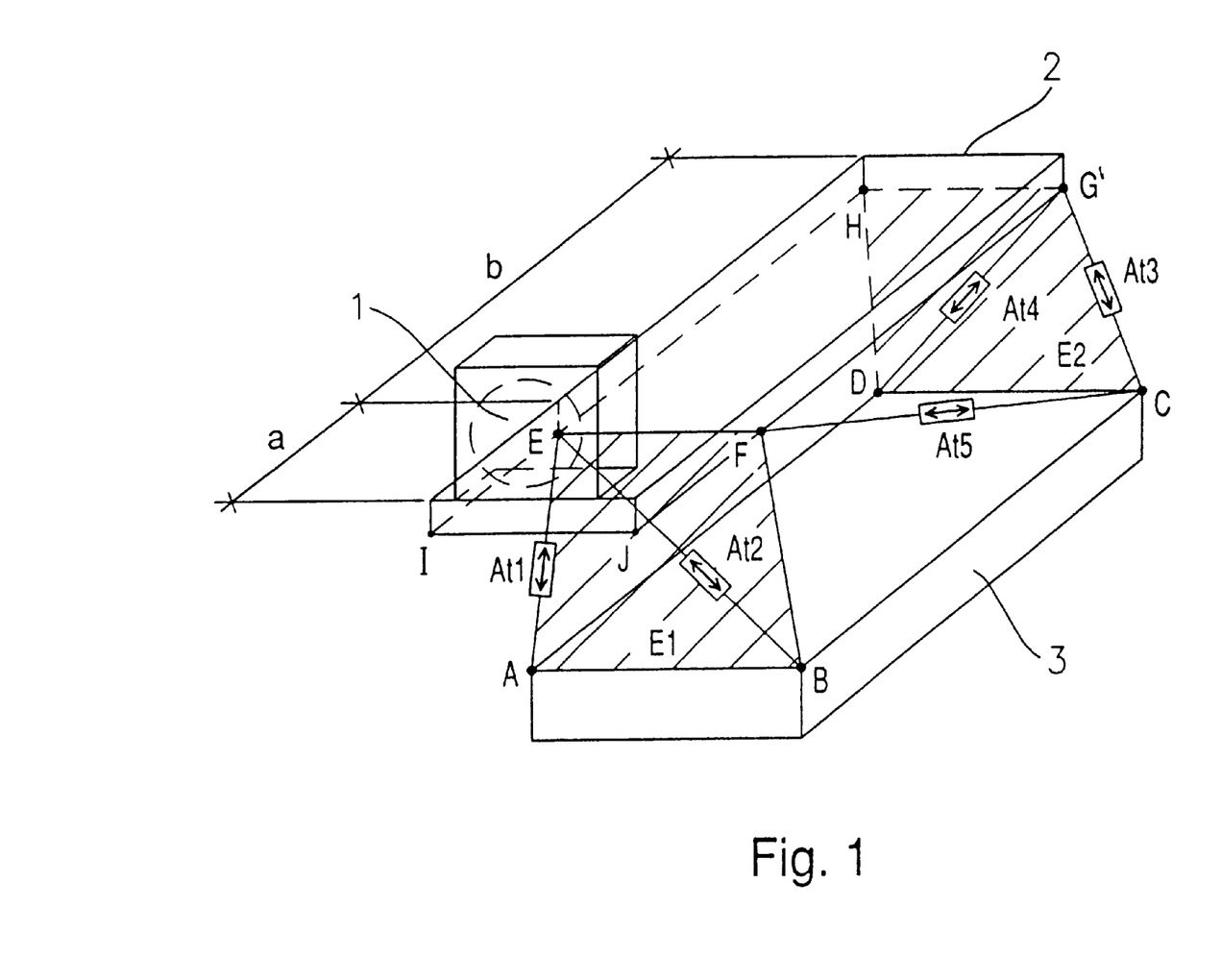
FIG. 1 is a diagrammatic, perspective view of an embodiment of an adjusting apparatus according to the invention with linear, bar-shaped adjusting elements.

The lens 1 is mounted on one end of the bending-resistant and torsionally rigid carrier plate 2 and the latter is generally connected to the likewise bending-resistant and torsionally rigid stationary base plate 3 in two planes E1 and E2. In FIG. 1, the plane E1 is defined by the points A, B, F, E and the plane E2 by the points C, G', H, D. A non-illustrated laser chip is likewise fixedly connected to the base plate 3. The connecting elements in the planes E1 and E2 are intended to be configured such that the lens 1 can be adjusted with regard to the base plate 3 in the x- and y-direction. For adjustment in the x- and y-direction, adjusting elements or actuators are expediently disposed in the planes E1 or E2 or in both planes. For the sake of simplicity, linear adjusting elements are assumed here, which connect the carrier plate 2 to the base plate 3 at at least three points. If actuators are present in both of the planes E1 and E2, then it is possible through appropriate selection of the dimensions a and b in FIG. 1 to perform a coarse adjustment in the plane E1 and then a fine adjustment of the lens position in the plane E2 in accordance with the transmission ratio a/(a+b). If an actuator only enables its length to be shortened (e.g. as a result of shrinkage of the actuator during laser bombardment) the lens 1 can, for example, thus be lowered through shortening of the actuator in plane E1 and subsequently be raised again by the actuator in plane E2 (in smaller steps). If a three-dimensional adjustment of the lens position (x-, y-, and z-direction) is desired, then it is necessary to provide a further actuator which effects tilting of the planes E1 and E2. FIG. 1 shows one possible fundamental configuration of actuators At1, At2, At3, At4 that enables coarse and fine adjustment of the lens position in the x- and y-direction and also adjustment in the z-direction. For the application referred to, by way of example, the "coarse adjustment" could cover a range of adjustment of from 1 to 50 $\mu$m and the fine adjustment a range of from 0.1 to 5 $\mu$m. Since the adjustment tolerance in the z-direction for the application chosen is typically one order of magnitude greater than in the x- and y-direction, a "coarse adjustment" in the z-direction is sufficient here.

Figure 2A:
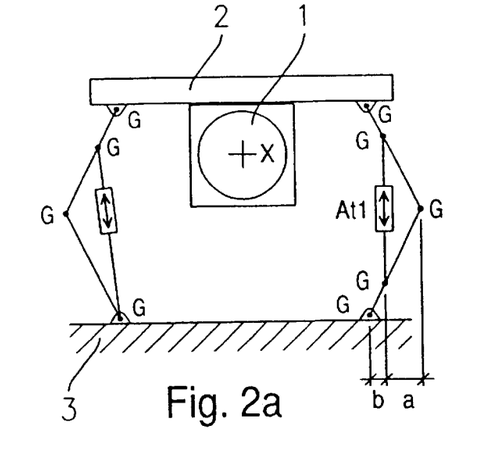
FIGS. 2a–2f are kinematical illustrations of the adjusting apparatus.
Figure 2B:
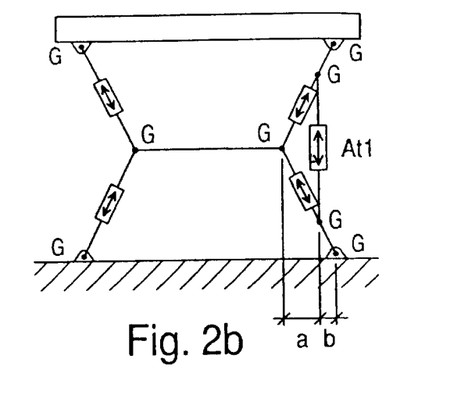
Figure 2C:
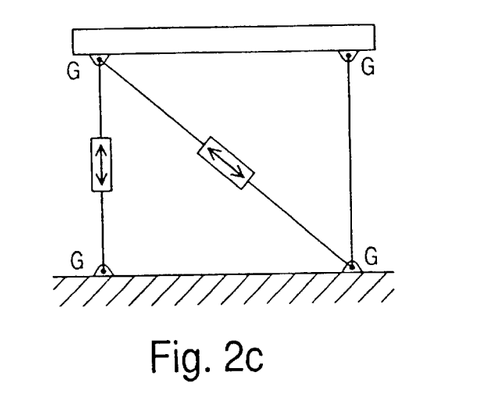
Figure 2D:
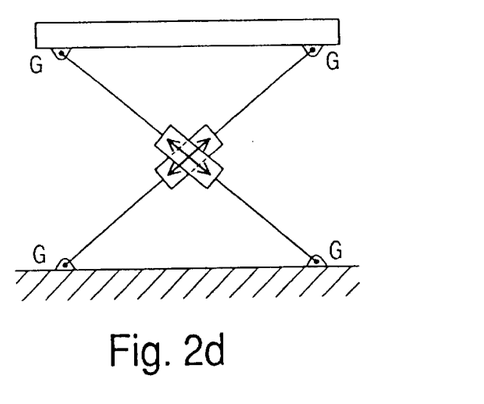
Figure 2E:
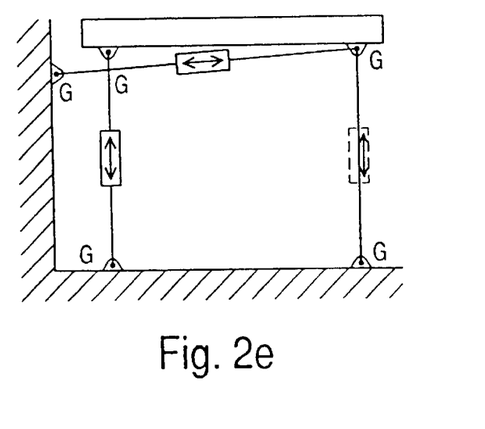
Figure 2F:
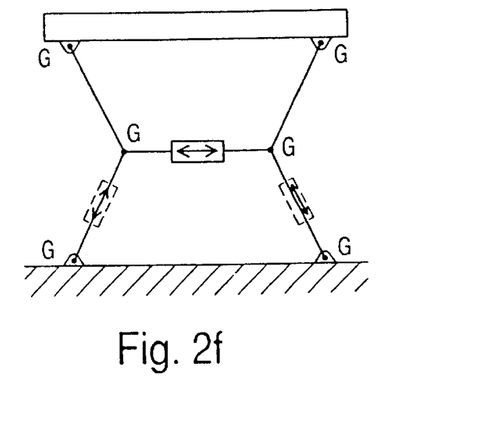

FIGS. 2a–2f illustrate, in principle, possible configurations of actuators, some of which are already realized, which enable adjustment in one or two coordinate directions. In this case, FIGS. 2a, 2b show exemplary embodiments of how the actuating distance of the actuator can be increased in the ratio (a+b)/a.

In the diagrammatic illustrations of FIGS. 1 and 2a–2f, the constructions are sketched in a similar manner to a framework, individual struts or all the struts of the framework being replaced by linear, for example bar-shaped actuators that are connected to the other struts via articulated joints G. In order to achieve high positional stability, it is necessary for the articulated joints G to be embodied without play and to provide for high bending resistance, torsional rigidity and buckling resistance of the entire construction. The easiest way of realizing the first requirement is to use flexible solid articulated joints G. To that end, the articulated joint connections between the struts are configured as connecting webs having a small cross section (reduced width, possibly also reduced thickness). The necessary rigidity can be achieved by skillful shaping of the actuator itself or by use of suitable additional elements.

Figure 3A:
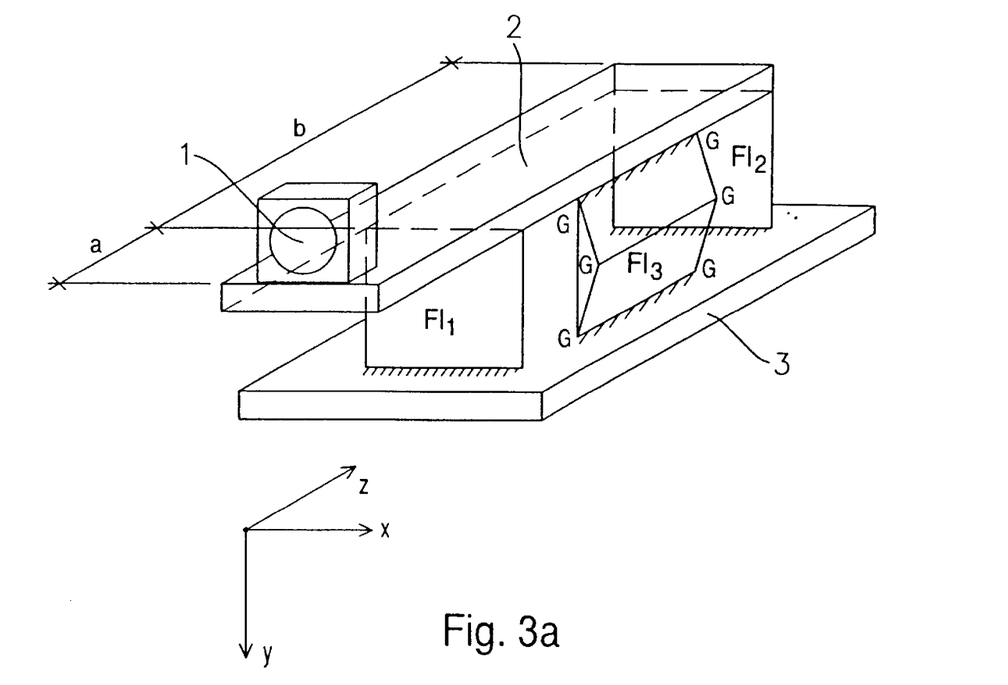
FIG. 3a is a perspective view of the adjusting apparatus with two-dimensional adjusting elements.
Figure 3B:
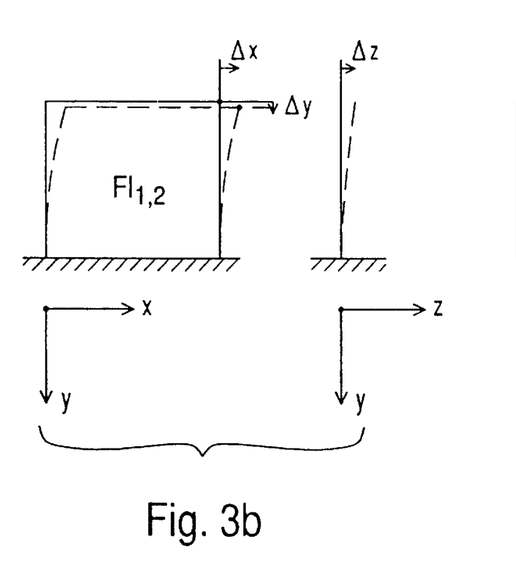
FIGS. 3b–3c are kinematical illustrations showing an embodiment of the adjusting apparatus with the two-dimensional adjusting elements.
Figure 3C:
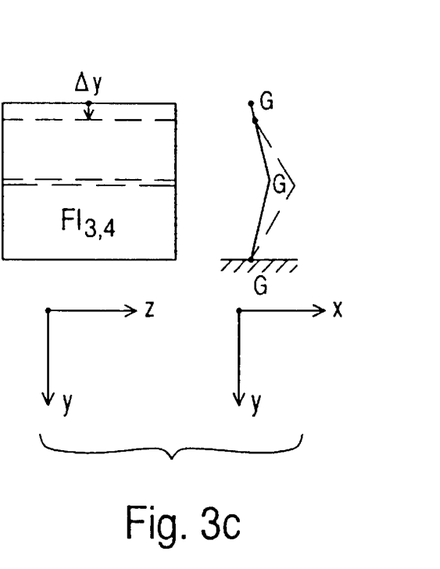

A very stable construction is achieved if flexible two-dimensional connecting elements, called "flex elements", hereinafter, are used instead of a framework-like construction with struts. FIG. 3a shows an example of a construction of this type, it initially being assumed that the lens 1 is intended to be adjusted only in the x- and y-direction. The construction contains two flex elements $Fl_1$ and $Fl_2$, which have a high rigidity in the x- and y-plane, and one or two flex elements orthogonal thereto, $Fl_3$ and $Fl_4$ ($Fl_4$ is not illustrated for the sake of clarity), possibly disposed symmetrically with regard to the y-z plane, which have a high rigidity in the y- and z-plane. FIG. 3b shows how the flex elements $Fl_1$ and $Fl_2$ are distorted in the plane by laser bombardment and, consequently, can carry out the desired movement of the lens 1 in the x- and y-direction, respectively. Suitable configurations of flex elements of this type will be shown later. The flexible articulated joints G in the flex elements $Fl_3$ and $Fl_4$ (see FIG. 3c) enable this movement with simultaneous stabilization of the z-position. The articulated joints G are configured as solid articulated joints having a small cross section (reduced width, possibly reduced thickness as well).

Figure 4A:
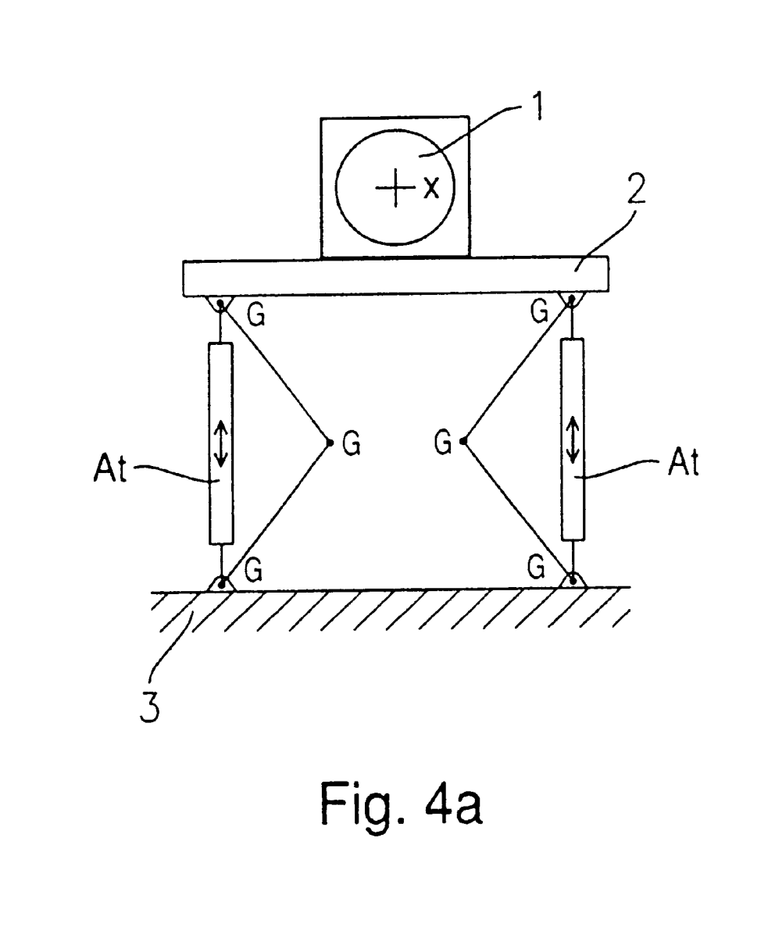
FIG. 4a is a kinematical illustration showing an embodiment of the adjusting apparatus with linear adjusting elements and areal connecting elements.
Figure 4B:
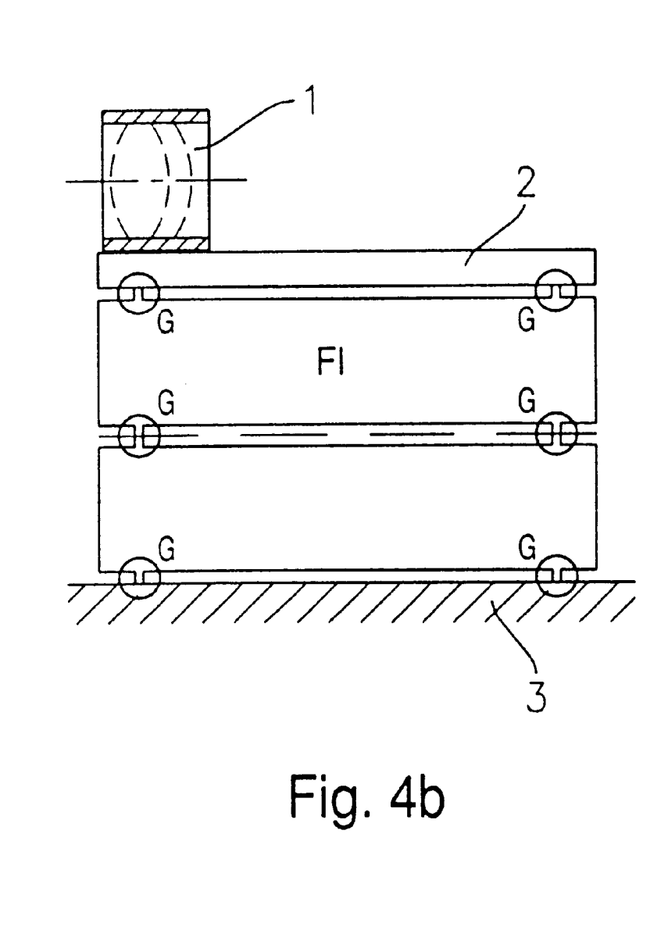
FIG. 4b is a side-elevational view showing the embodiment of the adjusting apparatus with the linear adjusting elements and the areal connecting elements.

FIGS. 4a, 4b show an embodiment similar to FIG. 2a with linear actuators At, the necessary rigidity in the y- and z-plane being achieved by the angular connecting element (flex element) Fl. As shown in FIG. 4b, the optoelectronic transmitting/receiving device has a transmitting/receiving component 4, a connection opening 5 for an optical fiber 6 and a lens 1 disposed between the connection opening 5 and the transmitting/receiving component 4. In order to increase the bending resistance and torsional rigidity of the flex elements, the latter can be stiffened by appropriate shaping (pressing or bending of suitable profiles). The mobility in the x-/y-direction is achieved by flexible solid articulated joints, in order to enable stiffening in the x- and y-direction by the actuators illustrated. According to the invention, the actuators are likewise embodied as solid elements that can be deformed in a targeted manner by laser bombardment. The laser bombardment results in either flexure or shrinkage of the solid element, which leads to the desired movement of the actuator At.

Figure 5A:
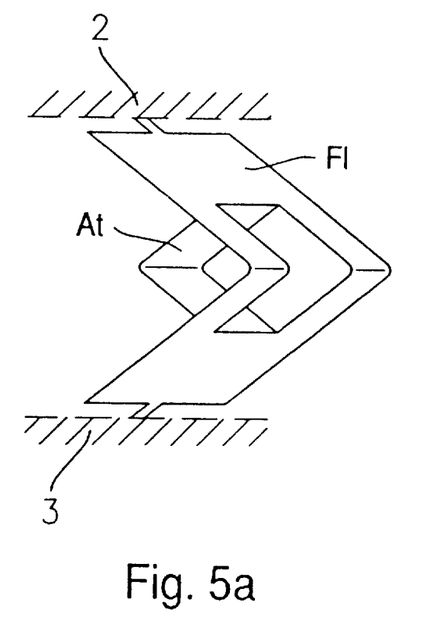
FIG. 5a is a perspective view of an angular adjusting element connected to an areal connecting element.
Figure 5B:
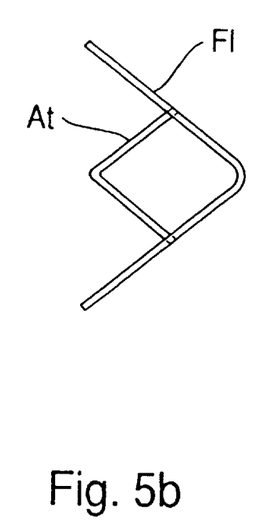
Figure 6:
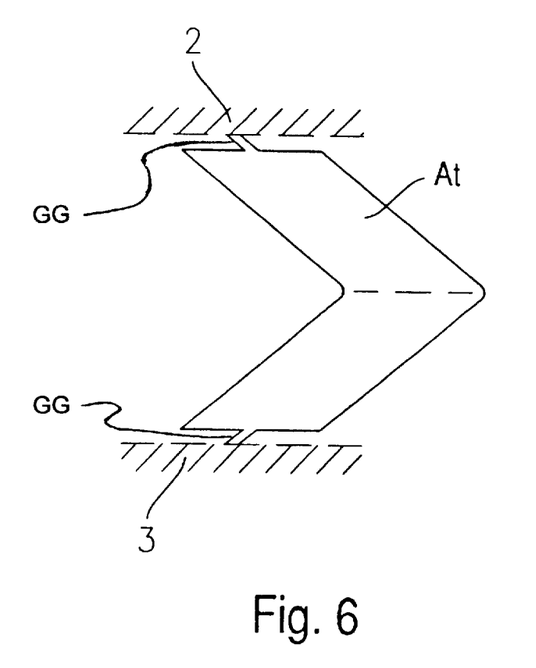
FIG. 6 is a side-elevational view of the angular adjusting element which is directly connected to the base plate and the carrier plate.

FIGS. 5a, 5b and 6 show examples of actuators in which flexure by laser bombardment is utilized. Depending on the position of the laser bombardment, the bending angle of the actuator At can be increased or decreased. Actuators of this type are described in European Patent Application EP 0 373 225 for example. FIGS. 5a, 5b show the actuator At that, at the ends of its planar sections, is connected to an angular connecting element (flex element) Fl which, for its part, is connected to the carrier plate 2 and the base plate 3. By contrast, FIG. 6 shows the angular actuator At which is directly connected to the carrier plate 2 and the base plate 3 by flexible solid articulated joints GG. The articulated joints GG are formed, as illustrated, by cutouts being made in the sheet-metal part, so that only a thin web remains in the center.

Figures 7A, 7B:
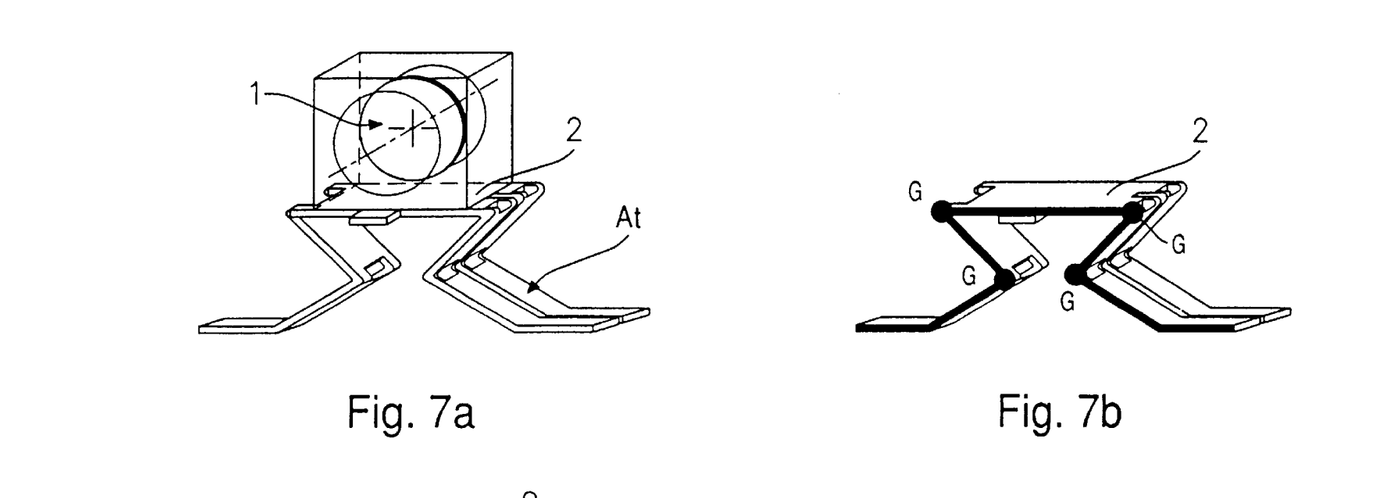
FIGS. 7a–7b are perspective views showing an embodiment of the adjusting apparatus with three angular adjusting elements.
Figure 7C:
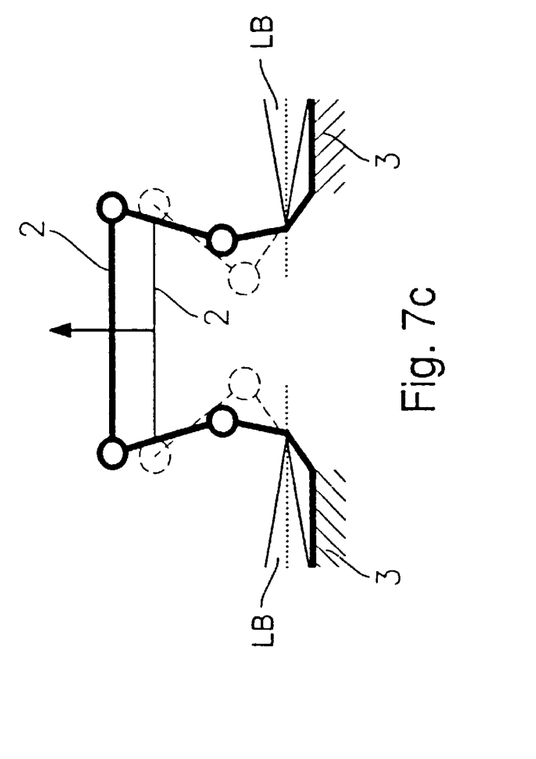
FIGS. 7c–7d are kinematical illustrations of the adjusting apparatus shown in FIGS. 7a, 7b during adjustment operations.
Figure 7D:
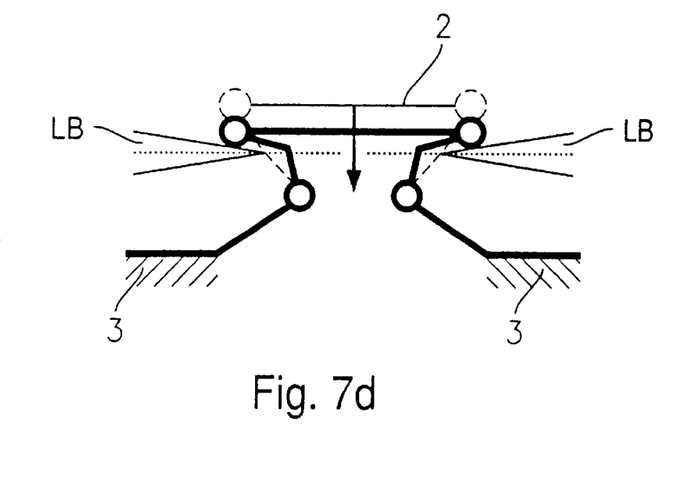

The adjusting apparatus illustrated in FIGS. 7a, 7b was conceived for spatial adjustment using the laser beam in the case of single-sided accessibility. The adjusting apparatus contains the carrier plate 2 for the lens 1 or the lens frame and also, for reasons of static determinacy, three actuator legs in the form of angular actuator elements. However, 2, 4 or more actuator legs are also conceivable. In the center and on the upper end the legs are provided with slots that weaken the bending resistance of the material at these points. As a result, these regions of the actuator act like articulated F joints G during laser beam bending processing. For an upward movement, a laser beam LB is simultaneously applied to the legs at the lower end, see FIG. 7c. On account of the temperature gradient in the interaction zone of the laser beam LB and the actuator leg, shrinkage stresses are introduced to the actuator leg non-uniformly over the sheet-metal thickness. As a result, one end of the actuator leg bends toward the incident laser beam LB. On account of the articulated joint action of the regions weakened by the slots the carrier plate 2 including the lens 1 moves upward. The comparable operation, namely the simultaneous processing on the upper end of the legs with the laser beam LB, results in a downward movement, see FIG. 7d bottom right. The actuator At can also be stiffened in the lateral plane by additional elements, as designated by $Fl_3$ in FIG. 3.

One disadvantage of the actuators based on bending is that mechanical strains are incorporated in the actuator At after the laser bombardment, which strains may result in dimensional changes particularly in the event of a change in temperature over long periods of time. It is generally not possible to anneal the incorporated stresses by heat treatment since otherwise the deformation obtained is partly lost again. Therefore, the actuators At based on shrinkage processes as a result of laser bombardment are advantageous for constructions that are particularly stable over the long term.

In this case, it is also generally possible, after the laser adjustment has been carried out, for the incorporated stresses largely to be relieved again by a local thermal treatment, without reversing the deformation.

Figure 8A:
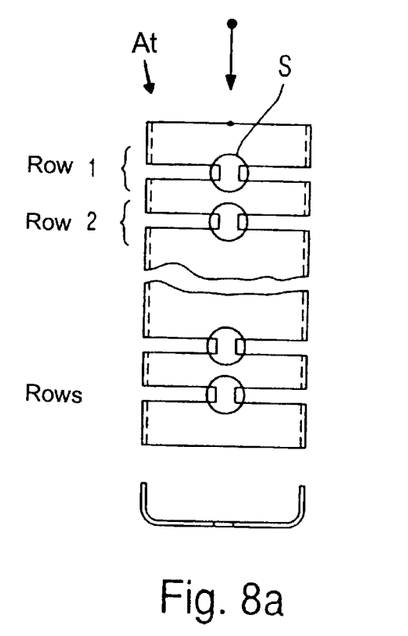
FIGS. 8a and 8b are side-elevational views of the adjusting elements for adjustment in one degree of freedom.
Figure 8B:
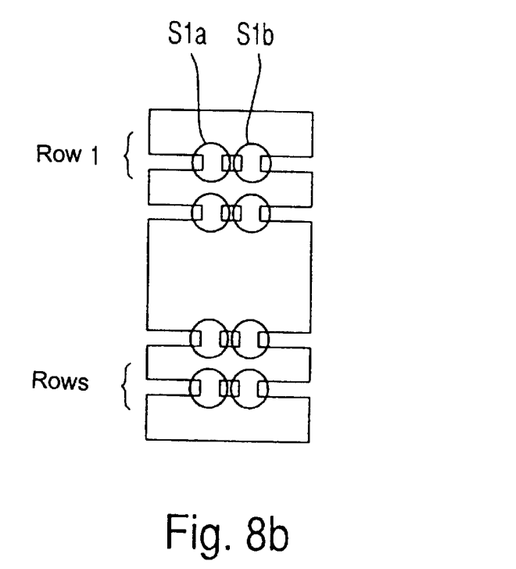
Figure 8C:
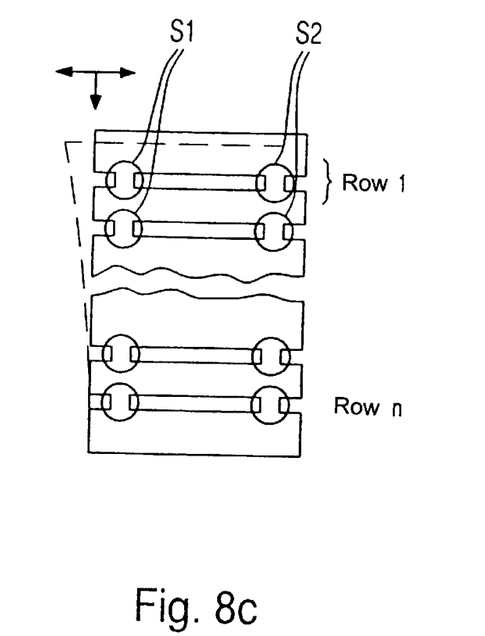
FIGS. 8c and 8d are side-elevational views of the adjusting elements for adjustment in two degrees of freedom.
Figure 8D:
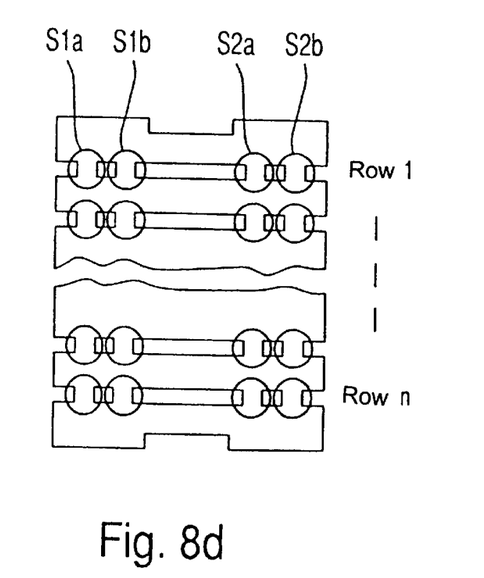

FIGS. 8a, 8b show examples of the linear actuators At (for one degree of freedom of the adjustment) that are based on shrinkage as a result of laser bombardment. The suitable locations for the laser bombardment are identified by "S". These locations are formed of comparatively thin webs S that connect individual actuating element members that are disposed in a suitable manner between the carrier plate 2 and the base plate 3. FIGS. 8c, 8d show actuators which permit adjustment in two degrees of freedom. By way of example, if the locations S1 and S2 are bombarded in pairs, then shortening is effected in the y-direction. By contrast, if only the locations S1 or S2 are bombarded, then an x-displacement occurs in conjunction with a smaller y-displacement. Depending on the height of the S1/S2 locations, the leverage can be used to alter the value of the x-displacement. In the case of the actuators in accordance with FIGS. 8b and 8d, the locations S1a and S1b or S2a and S2b are alternately bombarded in order to obtain the desired shrinkage. The desired bending resistance, buckling resistance and torsional rigidity can again be achieved through appropriate shaping of the cross section (see example in FIG. 8a). FIGS. 8a, 8b, 8c, 8d each illustrate a plurality of rows of the weak points "S" at which shrinkage can be obtained by laser bombardment. In most cases, however, a single row is sufficient, the desired shrinkage being able to be increased approximately is proportionally to the shot number through repeated laser bombardment.

Figure 8E:
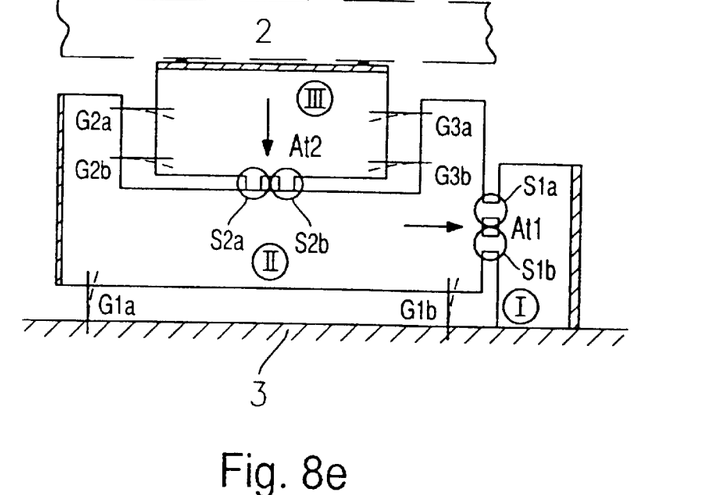
FIGS. 8e and 8f are side-elevational views of the adjusting elements for independent adjustment in two degrees of freedom.
Figure 8F:
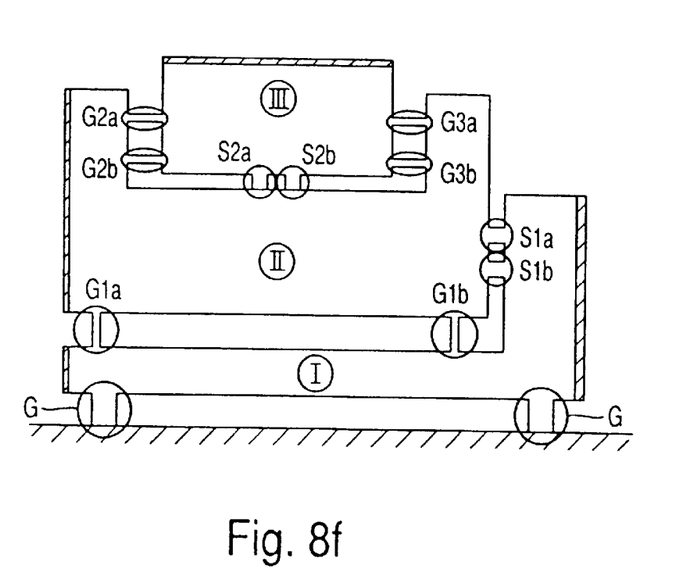
Figure 8G:
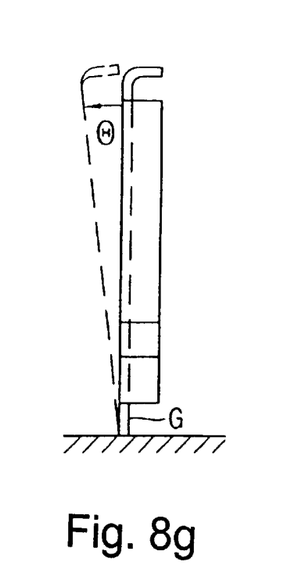
FIG. 8g is a side-elevational view of the adjusting element.

FIGS. 8e, 8f show an actuator for x/y adjustment, which is based on a combination of two linear actuators in accordance with FIG. 8b and parallelogram guides which are realized by flexible solid elements. The advantage of the embodiment according to FIGS. 8e, 8f compared with FIGS. 8c, 8d is that the x- and y-direction can be adjusted independently of one another. FIG. 8e first shows the basic principle. The first actuator At1 in FIG. 8e displaces part II in the x-direction relative to the part I connected to the base when the locations S1a and S1b are alternately bombarded by the laser. Solid articulated joints G1a and G1b make this parallel displacement possible. The second actuator At2 displaces part III in the y-direction when the locations S2a and S2b are alternately bombarded. The parallel displacement in the y-direction is made possible by the solid elements G2a, G2b and G3a, G3b. FIG. 8f shows a realization of the principle shown in FIG. 8e, additional solid articulated joints G providing for mobility in the Θ direction, FIG. 8g, in order that additional z-adjustment of the lens carrier 2 is made possible using an actuator in the y/z plane.

Figure 9:
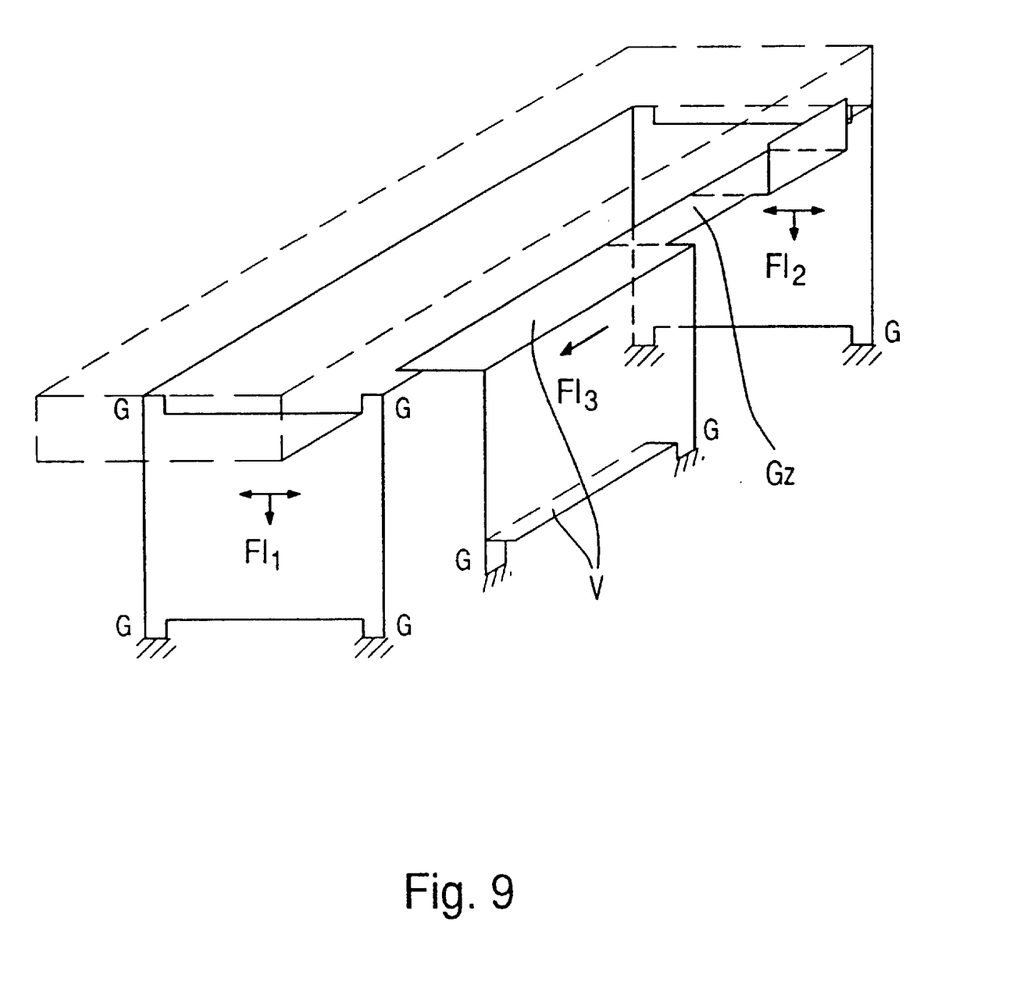
FIG. 9 is a perspective view of the adjusting apparatus for adjustment in three degrees of freedom.

Finally, FIG. 9 shows a corresponding construction with the possibility of adjustment in three degrees of freedom (x-, y-, z-direction). The construction generally utilizes two flex elements $Fl_{1-2}$ for two-dimensional adjustment (for example in accordance with FIGS. 8c, 8d or 8e, 8f) for the adjustment in the x- and y-direction and a further flex element $Fl_3$ for one-dimensional adjustment for the z adjustment, the further flex element transmitting its z movement to the carrier plate 2 via a flexible solid articulated joint Gz. The solid articulated joint Gz is flexible with regard to the y-movement and stiff for a tensile load in the z-direction. FIG. 9 illustrates examples of stiffening V of the flex element $Fl_3$ (top and bottom). The stiffness or flexibility of all the actuators can be influenced through a corresponding choice of cross sections or suitable shaping of the corresponding parts.

The actuators are expediently produced by stamping or cutting (laser cutting, water jet cutting) or etching of thin metal sheets, possibly also by galvanoplastic methods and also (subsequent) bending or pressing. The easiest way of connecting the actuators to the base plate 3 and the carrier plate 2 is by laser (spot) welding. In order to achieve a defined behavior during laser adjustment, it is important to relieve any stresses in the actuators by a suitable thermal treatment before the actual adjustment.

We claim:
1. An adjusting apparatus, comprising:
   a stationary base plate;
   a movable carrier plate; and
   a number of actuating elements each having a first end, a second end, and a form that changes due to a local application of radiation energy, each of said actuating elements connected to said stationary base plate at said first end and to said movable carrier plate at said second end.

2. The adjusting apparatus according to claim 1, wherein at least one of said actuating elements is a linear-shaped actuating element having a length that can be altered along one direction.

3. The adjusting apparatus according to claim 1, wherein said actuating elements include:
   a first actuating element connected to said movable carrier plate at a distance a from an outer edge of said movable carrier plate; and
   a second actuating element connected to said movable carrier plate at a distance b from said outer edge of said movable carrier plate, said first actuating element used for carrying out a coarse adjustment and said second actuating element used for carrying out a fine adjustment with a transmission ratio a/(a+b).

4. The adjusting apparatus according to claim 1, including at least one web, and at least one of said actuating elements has at least two actuating element members disposed in a direction of a normal between said stationary base plate and said movable carrier plate at a distance from one another and are each connected to one another by said at least one web.

5. The adjusting apparatus according to claim 1, wherein at least one of said actuating elements has webs and at least three actuating element members disposed between said stationary base plate and said movable carrier plate, at least two of said actuating element members are disposed relative to one another in such a way that they are disposed in a direction of a normal between said stationary base plate and said movable carrier plate at a distance from one another and are connected to one another by at least one of said webs, at least two of said actuating element members disposed relative to one another in such a way that they are spaced apart from one another in a lateral direction and are connected to one another by at least one of said webs.

6. The adjusting apparatus according to claim 1, wherein at least one of said actuating elements is an angular actuating element having two planar sections disposed at an angle with respect to one another and having articulated joints connected to said stationary base plate and said movable carrier plate (FIGS. 5a, b, FIG. 6).

7. The adjusting apparatus according to claim 6, wherein said angular actuating element is one of two angular actuating elements disposed on two opposite sides of said movable carrier plate.

8. The adjusting apparatus according to claim 6, wherein said articulated joints are formed by one of a reduced material thickness and by cutouts formed in said angular actuating element.

9. The adjusting apparatus according to claim 1, wherein at least one actuating element of said actuating elements has connections directly connected to said stationary base plate and said movable carrier plate.

10. The adjusting apparatus according to claim 9, wherein at least one of said connections is a joint.

11. The adjusting apparatus according to claim 1, including an angle element having two planar sections disposed at an angle with respect to one another and define an articulated joint where said two planar sections are connected to each other, at least one of said actuating elements is connected to said angle element, said planar sections each have a connection connected to one of said stationary base plate and said movable carrier plate and said connection of at least one of said planar sections is an articulated joint.

12. The adjusting apparatus according to claim 10, wherein said joint is formed by one of a reduced material thickness and by cutouts formed in said actuating element.

13. The adjusting apparatus according to claim 1, including a lens disposed on said movable carrier plate.

14. The adjusting apparatus according to claim 1, wherein said linear-shaped actuating element is a bar-shaped actuating element.

15. An optoelectronic transmitting/receiving device, comprising:
a transmitting/receiving component;
a connector having a connection opening formed therein for an optical fiber;
a lens disposed between said connection opening and said transmitting/receiving component; and
an adjusting apparatus, including:
a stationary base plate;
a movable carrier plate supporting said lens; and
a number of actuating elements each having a first end, a second end, and a form that changes due to a local application of radiation energy, each of said actuating elements connected to said stationary base plate at said first end and to said movable carrier plate at said second end.

16. The optoelectronic transmitting/receiving device according to claim 15, wherein said transmitting/receiving component is mounted on said adjusting apparatus.

17. An adjustment method, which comprises the steps of:
providing an adjusting apparatus having a stationary base a movable carrier plate, and a number of actuating elements each having a first end, a second end, each of the actuating elements connected to the stationary base plate at the first end and to the movable carrier plate at the second end, and having a form that changes due to a local application of radiation energy; and
feeding a predetermined quantity of the radiation energy to the actuating elements at predetermined locations, thereby altering the form of the actuating elements.

18. The method according to claim 17, which comprises:
providing at least one of the actuating elements to have at least two actuating element members disposed in a direction of a normal between the stationary base plate and the movable carrier plate at a distance from one another and are each connected to one another by at least one web; and
feeding the radiation energy to the web.

19. The method according to claim 17, which comprises:
providing at least one of the actuating elements as an angular actuating element having two planar sections disposed at an angle with respect to one another and having articulated joints connected to the stationary base plate and the movable carrier plate; and
feeding the radiation energy to the planar sections.

20. The method according to claim 19, which comprises feeding the radiation energy to the planar sections of the actuating elements which face the stationary base plate for increasing a distance between the movable carrier plate and the stationary base plate.

21. The method according to claim 19, which comprises feeding the radiation energy to the planar sections of the actuating elements which face the movable carrier plate for reducing a distance between the movable carrier plate and the stationary base plate.

22. The method according to claim 17, which comprises using a laser beam for supplying the radiation energy.

* * * * *